United States Patent [19]

Cohen

[11] Patent Number: 4,701,104
[45] Date of Patent: Oct. 20, 1987

[54] RAM AIR TURBINE

[75] Inventor: Modehy Cohen, Rockford, Ill.

[73] Assignee: Sundstrand Corporation, Rockford, Ill.

[21] Appl. No.: 875,460

[22] Filed: Jun. 18, 1986

[51] Int. Cl.⁴ .............................................. F01D 7/02
[52] U.S. Cl. ..................................... 416/44; 416/51; 416/152
[58] Field of Search ............... 416/43 A, 44 A, 50 A, 416/51 A, 52 A, 53 A, 152, 165, 139 A, 32

[56] References Cited

U.S. PATENT DOCUMENTS

| | | | |
|---|---|---|---|
| 2,685,932 | 8/1954 | Hartel | 416/51 A X |
| 2,777,524 | 1/1957 | Chapman et al. | 416/53 A |
| 2,820,440 | 1/1958 | Jacobs | 123/41.11 |
| 2,874,787 | 2/1959 | Battenberg et al. | 416/51 A X |
| 2,876,847 | 3/1959 | Blackburn et al. | 416/52 A |
| 2,963,093 | 12/1960 | Drexel et al. | 416/53 A |
| 2,967,572 | 1/1961 | Breaux et al. | 416/43 A |
| 2,970,652 | 2/1961 | Breaux et al. | 416/152 X |
| 3,154,150 | 10/1964 | Dhonau | 416/43 A |
| 3,339,639 | 9/1967 | Elmes et al. | 416/154 X |
| 3,469,633 | 9/1969 | Avondoglio | 416/51 A |
| 3,635,584 | 1/1972 | Chilman et al. | 416/48 |
| 4,411,596 | 10/1983 | Chilman | 416/51 |
| 4,462,753 | 7/1984 | Harner et al. | 416/48 |
| 4,578,019 | 3/1986 | Safarik | 416/32 X |

FOREIGN PATENT DOCUMENTS

| | | | |
|---|---|---|---|
| 599420 | 6/1960 | Canada | 416/44 A |
| 1242079 | 8/1960 | France | 416/44 A |
| 767907 | 2/1957 | United Kingdom | 416/51 A |

Primary Examiner—Everette A. Powell, Jr.
Attorney, Agent, or Firm—Wood, Dalton, Phillips Mason & Rowe

[57] ABSTRACT

Complexity, and thus reliability difficulties, are avoided in a ram air turbine including a stationary shaft 14 defining an axis of rotation 16. A hub 24 is journalled on the shaft 14 and in turn movably mounts at least one blade 38 for positioning between a feathered position and a plurality of positions of different pitch. A selectively operable brake 96, 100, 116 is mounted on the shaft 14 and a screw 112 is journalled on the shaft for rotation about the axis 16. The screw has a head 114 engageable by the brake 96, 100, 116 and exterior, widely spaced threads 120. A governor plate 50 is disposed about the shaft 14 and includes a sleeve 124 with widely spaced internal threads 126 surrounding the screw 112. The governor plate is connected to the blades 38 to position the same in response to movement of the governor plate 50. A torsional spring 130 is connected to the screw 112 to effect rotation of the same when the brake 90, 100, 116 is disengaged.

9 Claims, 4 Drawing Figures

RAM AIR TURBINE

FIELD OF THE INVENTION

This relates to a ram air turbine, and more particularly, to a ram air turbine as may be utilized to drive a pump in a refueling or an electrical generator.

BACKGROUND OF THE INVENTION

Ram air turbines have been utilized in a variety of aeronautical applications. Not untypically, they are utilized as auxiliary power sources. For example, ram air turbines may be connected to electrical generators which serve as an auxiliary electrical generator. When the main power generators experience difficulty in operation, the ram air turbine is deployed in the air stream in which the aeronatical vehicle is travelling. The force of the passing ram air on the turbine will cause the same to rotate and provide mechanical motion necessary to drive the generator.

Ram air turbines have also been utilized in connection with air-to-air refueling apparatus. In such a case, they may be utilized to drive a pump which in turn transfers fuel from one aircraft to another during a refueling process.

Particularly when ram air turbines are utilized as part of refueling apparatus, they are unlikely to be stowed out of the air stream until their use is required. As a consequence, it is desirable that they provide minimal drag on the aircraft on which they are mounted while the same moves to and from a refueling point. This will generally dictate that variable pitch blades used as part of the ram air turbine be maintained in a feathered position except when operation is intended.

It is also desirable that the turbine be locked against rotation except when in use. This is particularly desirable when the aircraft carrying the apparatus is located on an air field or a carrier deck. If surface winds were permitted to cause windmilling of the turbine, bodily harm could come to maintenance personnel in the vicinity of the apparatus.

It is also desirable that the ram air turbine include means whereby the same will revert to a feathered configuration in the event of a failure within the system. And of course, it is most desirable of all that these features be provided by a simple and reliable system.

SUMMARY OF THE INVENTION

It is a principal object of the invention to provide a new and improved ram air turbine. More particularly, it is an object of the invention to provide a new and improved ram air turbine that is extremely simple, and thus reliable in its construction and which meets the desirable criteria mentioned immediately preceding.

An exemplary embodiment of the invention achieves the foregoing object in a structure including a hub rotatable about an axis, a plurality of blades journalled on the hub for rotation between feathered, coarse pitch and fine pitch positions, and a reciprocating to rotary motion converting mechanism connected to the blades. Means including a flyweight assembly are provided for controlling the pitch of the blades between the coarse and fine pitch positions to achieve a desired rotational rate of the hub by providing a reciprocating input to the mechanism. Means are also provided for controlling the pitch of the blades to and from the feathered position and include a brake, a selectively operable control for engaging or disengaging the brake, and a rotatable screw connected to the mechanism to provide a reciprocating input thereto upon rotation of the screw. The brake, when engaged, resists rotation of the screw and there is provided a torsional/compression spring interconnecting the screw and the mechanism for providing (a) a reciprocating input to the mechanism and (b) rotating the screw.

This structure provides a wholly mechanical approach to a ram air turbine and the control of the same which in turn provides in increased and highly desirable reliability.

A preferred embodiment of the invention contemplates that the reciprocating to rotary motion converting mechanism includes a governor plate having a threaded opening generally concentric with the axis of rotation of the hub. The screw is threaded in the threaded opening and the threads in the opening and the screw are spaced a distance substantially greater than the width of a thread so as to establish a limited lost motion connection between the screw threads and the governor plate.

Preferably, the spring is a coil spring having one end secured to the screw and the other end secured to the governor plate. The threaded opening is defined by an internally threaded sleeve on the governor plate and the spring is coiled about the sleeve.

The invention also contemplates that the screw have a head adapted to be engaged by the brake and that the spring be disposed in compressed relation between the head and the governor plate.

The brake may utilize an actuator in the form of an annular solenoid mounted on a stationary shaft which in turn journals the hub. An annular brake pad is carried by the head of the screw in proximity to the actuator.

Other objects and advantages will become apparent from the following specification taken in connection with the accompanying drawings.

DESCRIPTION OF THE PREFERRED EMBODIMENT

Figure 1:
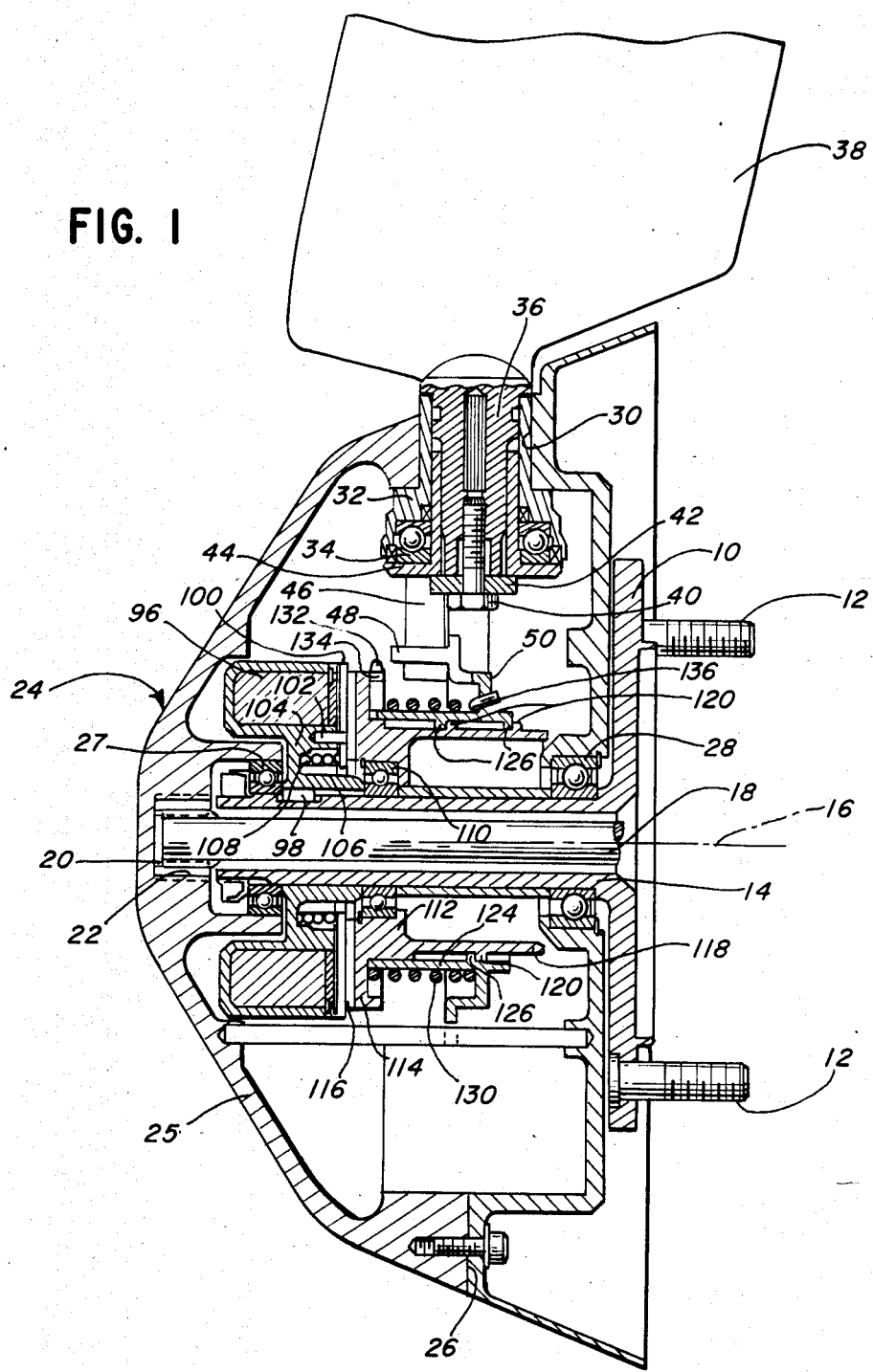
FIG. 1 is a fragmentary, sectional view of a ram air turbine made according to the invention.

An exemplary embodiment of a ram air turbine made according to the invention is illustrated in the drawings and with reference to FIG. 1 is seen to include a base 10 having threaded studs 12 by which the turbine assembly may be mounted to frame or the like. Extending forwardly of the base plate 10 is a stationary shaft 14 which is hollow. The shaft 14 defines a rotational axis 16 for the ram air turbine and extending along the axis 16 within the hollow of the shaft 14 is a power take-off shaft 18. The power take-off shaft 18 is connected to the load to be driven (not shown) such as a generator, pump or the like.

The end of the take-off shaft 18 remote from the base plate 10 is splined as at 20 and is coupled by mating splines 22 to a rotatable hub 24 formed of two pieces 25 and 26. The hub 24 is journalled for rotation about the axis 16 by spaced sets of bearings 27 and 28.

The hub also includes four radially directed bores 30 (only one of which is shown). Each of the bores 30 receives a mounting sleeve 32 which mounts a bearing 34 to journal a stub shaft 36 extending from a turbine blade 38. A bolt 40 and washer 42 threaded into the stub shaft 36 cooperate with a collar 44 to retain the stub shaft 36.

The collar 44 has an eccentric 46, that is, a shaft whose axis is spaced from but parallel to the axis of the associated stub shaft 36. The shaft 46 extends through a tongue 48 which extends axially away from the base 10 and which is located on the periphery of a governor plate 50. The tongue 48 has a circumferentially elongated opening 52 through which the eccentric 46 extends.

Figure 4:
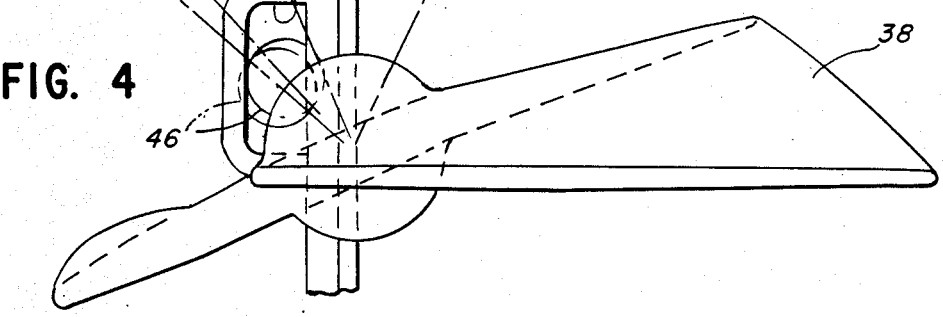
FIG. 4 illustrates the relationship of a blade and a governor plate.

As a result of this construction, reciprocal movement of the governor plate 50 along the axis of rotation 16 will result rotation of the blades 38 and the pitch of the blades 38 being changed. As seen in FIG. 4, a blade 38 is shown in a feathered position designated "FEATHER". Reciprocal movement of the governor plate 50 will cause pivoting of the blade between the limit designated "OT", or overtravel which is just past the feathered position and a position designated "FINE" which corresponds to a fine pitch position. An intermediate position is designated "COARSE" and, of course, defines a coarse pitch position.

As is well known, the provision for varying the pitch of the blade is desirable so as to maintain a constant speed of the ram air turbine in spite of varying loads and to provide a means for feathering the blades in the event of a system malfunction or to reduce drag.

Conventionally, in order to attain constant speed, a governor is employed such as a flyweight governor.

Figure 2:
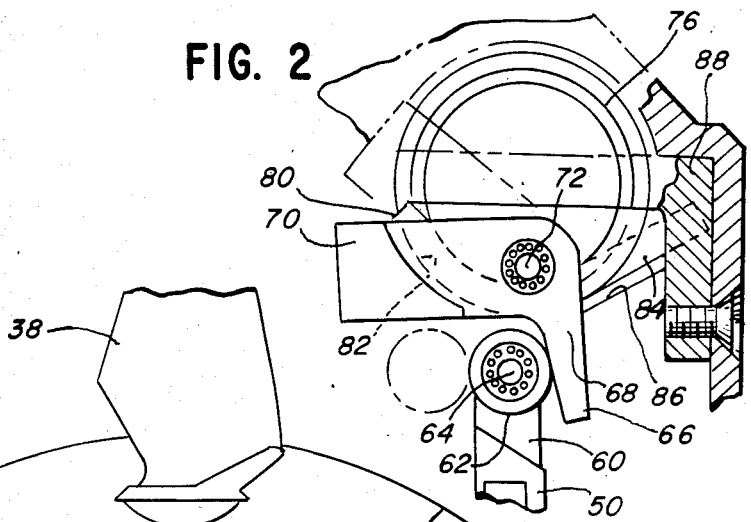
FIG. 2 is an enlarged, fragmentary view of a portion of a flyweight assembly.
Figure 3:
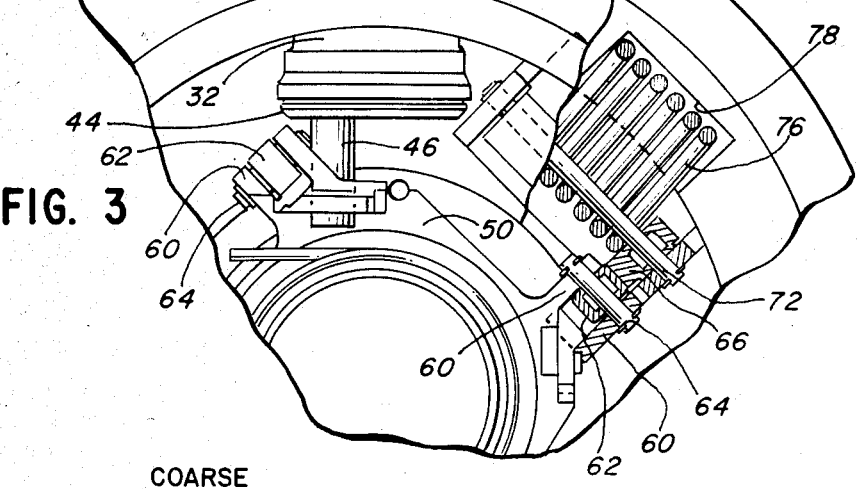
FIG. 3 is an enlarged, fragmentary view of a portion of the governing mechanism.

As seen in FIGS. 2 and 3, at four equally angularly spaced locations (only two of which are shown), spaced lugs 60 extend from the periphery of the governor plate 50. A roller 62 is mounted by a shaft 64 between each set of the lugs 60 and is abutted by one arm 66 of a bellcrank 68 carrying a flyweight 70 on its opposite arm. The bellcrank 68 is pivoted intermediate its ends by a shaft 72 secured to the hub 24 by conventional means. A torsional spring 76 in coil form is partially disposed in a recess 78 within the interior of the hub and located about the shaft 72. As best seen in FIG. 2, one end 80 of the spring 76 is received in a groove 82 in the arm of the bellcrank 68 mounting the flyweight 70. The opposite end 84 of the spring is received in a slotted groove 86 in a mounting bracket 88 which may be employed to mount one end of the shaft 72.

As a result of this construction, each bellcrank 68 is biased in a counterclockwise direction about its shaft 72 as viewed in FIG. 2 and such bias is such as to permit the governor plate 50 to move to the right as viewed in the drawings. However, in operation of the apparatus, centrifugal force acting on the flyweight 70 will tend to cause the bellcrank 68 to rotate in a clockwise direction about their shafts 72 and this motion will be applied to the governor plate 50 via the rollers 62 to urge the governor plate 50 to the left as viewed in FIGS. 1, 2 and 4.

As will be readily appreciated by those skilled in the art, the forces provided by the springs 76 and those resulting from centrifugal force will balance at some particular point which will locate the plate at a location in its reciprocal path of movement that will provide the desired pitch to achieve a predetermined rate of rotation of the hub 24, and thus the take-off shaft 18.

Returning to FIG. 1, an annular solenoid assembly 96 is mounted on the stationary shaft 14 and secured against rotation with respect thereto by means of a key 98.

A plate 100 made of ferro-magnetic material is located concentrically about the shaft 14 and guided for reciprocating movement towards and away from the coil 96 by means of pins 102 received in bores in the housing 104 of the solenoid coil 96. An annular recess 106 in the housing 104 mounts a compression coil spring 108 which bears against the plate 100 to bias the same away from the coil 96.

A bearing 110 disposed on the shaft 14 mounts a screw 112 having a head 114 which supports a brake pad 116 in a position to be engaged by the plate 100. The elements 110, 112, 114 and 116 are generally concentric about the axis 16.

The screw 112 includes an exteriorally threaded shank 118 bearing a continuous thread 120 whose adjacent covolutions are widely spaced. That is to say, the spacing between adjacent convolutions of the thread 120 is much greater than the width of each convolution as can be seen in FIG. 1.

The governor plate has an axially directed, integral sleeve 124 which is internally threaded as at 126. Each convolution of the thread 126 is widely spaced from the adjacent convolution and the relationship is identical to that of the convolutions of the thread 120. The arrangement is such that relative movement between the governor plate 50 and the screw 112 may occur within limits. The structure provides a limited lost motion connection and normal adjustment of the pitch of the blades 38 under the influence of the flyweight assemblies will occur with the governor plate 50 moving axially relative to the screw 112 within the limits of such lost motion connection.

The assembly is generally completed by a combination torsional and compression coil spring 130. The same is disposed about the sleeve 124 and has one end 132 abutted against an axially extending tongue 134 on the head 114 of the screw 112. Another end 136 is located in an aperture within the governor plate 50.

The spring 130 provides two functions when loaded. The same is always loaded in the axial direction, that is, under compression accordingly, biases the governor plate 50 away from the head 114 of the screw 112. This tends to bias the thread 126 on the sleeve 124 against the thread 120 on the screw 112.

Secondly, the spring 130 tends to effect a slight degree of relative rotation between the screw 112 and the governor plate 50. In a typical case, the solenoid coil 96 will be deenergized with the blades 38 in a feathered position and there will be slight torsional loading on the spring 130. the manner in which such loading is placed on the spring 130 will be described hereinafter. In any event, deenergization of the solenoid coil 96 will result in engagement between the plate 100 and the pad 116 which in turn will resist rotary movement of the screw 112. Rotation of the hub 24 will not be occurring at this time because the blades 38 are in a feathered position.

Upon energization of the solenoid 96 to initiate operation of the turbine, the plate 100 will be moved axially to the left against the bias of the spring 108 and out of engagement with the pad 116 as viewed in FIG. 1. This will release the restraining force on the screw 112 and the torsional loading on the same cause it to rotate slightly relative to the governor plate 50 in a direction that will allow the sleeve 124, and thus the governor plate 50, to move slightly to the right as viewed in FIG. 1. This in turn will cause the blades 38 to move from the feather position (FIG. 4) towards the coarse position and as soon as such movement is made, the blades 38 will begin to catch the air stream and the ram air force will continue such movement accelerating the turbine, including the screw 112 and the governor plate 50, up to its desired rate of speed at which time the flyweight assemblies will be fully effective to govern the rate of rotation of the apparatus.

When it is desired to halt the operation of the apparatus, or should a fault occur in the electrical system for actuating the solenoid coil 96, the latter will become deenergized. As a consequence, the compression coil spring 108 will drive the plate 100 into the pad 116. The screw 112, which up until this point had been rotating freely at the same speed as the hub 24 will have its rotation halted. Continued rotation of the hub 24 under the driving influence of the wind on the blades 38 will cause the governor plate 50 and the sleeve 124 to rotate relative to the stationary screw in such a way as to move the governor plate 50 to the left as viewed in FIGS. 1, 2 and 4. This movement will cause the blades 38 to be moved toward their overtravel (OT) position. When this position is attained, the blades 38 develop what may be termed a "negative" torque which, together with the friction developed by engagement between the plate 100 and the brake pad 116 act to first slow, and then stop the hub 24.

At the same time that such relative movement between the screw 112 and the sleeve 124 is occurring, the spring 130 will be torsionally loaded to the point required to cause unfeathering on the next succeeding cycle.

By the foregoing, it will be appreciated that a ram air turbine made according to the invention is wholly mechanical and accordingly extremely simple in construction and highly reliable. It will be recognized that the unique braking arrangement prevents the turbine from windmilling when not in use by reason of the engagement of the brake with the hub via the screw 112 and sleeve 124. Consequently, the possibility of injury to persons in the vicinity of the turbine on a windy day is avoided.

It will also be appreciated that activation and deactivation of the turbine can be readily effected through the use of a simple electrical circuit for energizing or deenergizing the solenoid coil 96.

I claim:

1. A ram air turbine comprising
   a hub rotatable about an axis;
   a plurality of blades journalled on said hub for rotation between feathered, coarse pitch and fine pitch positions;
   a reciprocating to rotary motion converting mechanism connected to said blades;
   means, including a flyweight assembly, for controlling the pitch of said blades between said coarse and fine pitch positions to achieve a desired rotational rate of said hub by providing a reciprocating input to said mechanism; and
   means for controlling the pitch of said blades to and from said feathered position and including a brake, a selectively operable control for engaging or disengaging said brake, a rotatable screw connected to said mechanism to provide a reciprocating input thereto upon rotation of said screw, said brake, when engaged, resisting rotation of said screw, and means including a torsional/compression spring interconnecting said screw and said mechanism for providing (a) a reciprocating input to said mechanism and for (b) rotating said screw.

2. The ram air turbine of claim 1 wherein said mechanism includes a governor plate having a threaded opening generally concentric with said axis and said screw is threaded in said threaded opening, the threads in said opening and on said screw being spaced a distance substantially greater than the width of a thread so as to establish a limited lost motion connection between said thread and said governor plate.

3. The ram air turbine of claim 2 wherein said spring is a coil spring having one end secured to said screw and another end secured to said governor plate, said threaded opening being defined by an internally threaded sleeve on said governor plate, said spring being coiled about said sleeve.

4. The ram air turbine of claim 3 wherein said screw has a head adapted to be engaged by said brake and said spring is disposed in compressed relation between said head and said governor plate.

5. A ram air turbine comprising
   a stationary shaft defining an axis of rotation;
   a hub journalled on said shaft and in turn movably mounting at least one blade for positioning between a feathered position and a plurality of positions of different pitch;
   a selectively operable brake mounted on said shaft;
   a screw journalled on said shaft for rotation about said axis and having a head engageable by said brake, said screw having exterior, widely spaced threads;
   a governor plate about said shaft and including a sleeve with widely spaced internal threads surrounding said screw, said governor plate being connected to said blade to position the same in response to movement of said governor plate; and
   a torsional spring connected to said screw to effect rotation of the same when said brake is disengaged.

6. The ram air turbine of claim 5 wherein said torsional spring is a coil spring disposed about said sleeve and interconnecting said governor plate and said screw.

7. The ram air turbine of claim 6 wherein said coil spring further is a compression spring biasing said screw and said governor plate apart.

8. The ram air turbine of claim 5 wherein said brake includes an actuator in the form of an annular solenoid mounted on said shaft and an annular brake pad carried by said screw head.

9. The ram air turbine of claim 8 further including a flyweight assembly operatively associated with said governor plate.

* * * * *